United States Patent
Tschopp

[19]

[11] 3,719,722
[45] March 6, 1973

[54] PURIFICATION OF UNSATURATED PRODUCT
[75] Inventor: Lloyd D. Tschopp, Humble, Tex.
[73] Assignee: Petro-Tex Chemical Corporation, Houston, Tex.
[22] Filed: Sept. 30, 1970
[21] Appl. No.: 76,751

[52] U.S. Cl. ............260/680 D, 260/681.5 R, 203/81
[51] Int. Cl. .............................C07c 11/16, C07c 7/04
[58] Field of Search ....................260/681.5 R, 680 D

[56] References Cited

UNITED STATES PATENTS

| | | | |
|---|---|---|---|
| 3,327,001 | 6/1967 | Tschopp | 260/681.5 R |
| 3,402,215 | 9/1968 | Woerner et al. | 260/680 R |
| 3,412,171 | 11/1968 | Welch et al. | 260/681.5 |
| 3,474,155 | 10/1969 | Tschopp et al. | 260/677 |

Primary Examiner—Delbert E. Gantz
Assistant Examiner—Veronica O'Keefe
Attorney—G. Baxter Dunaway

[57] ABSTRACT

Methyl Chloride and vinyl chloride can be essentially eliminated from a butadiene stream derived from an oxidative dehydrogenation of n-butenes in the presence of chlorine by first separating the butadiene from the higher boiling $C_4$'s and concentrating the methyl chloride and vinyl chloride in the butadiene fraction by fractionation then fractionating the butadiene fraction to produce a concentrate of methyl chloride and vinyl chloride as an overhead and producing a butadiene product essentially free of chlorides. The loss in butadiene based on the initial feed to this purification is less than 0.15 percent volume. The use of chlorine in the oxidative dehydrogenation which necessitates the purification produces 5 to 15 mole percent absolute more butadiene than the same process in the absence of chlorine thus justifying the purification.

5 Claims, 1 Drawing Figure

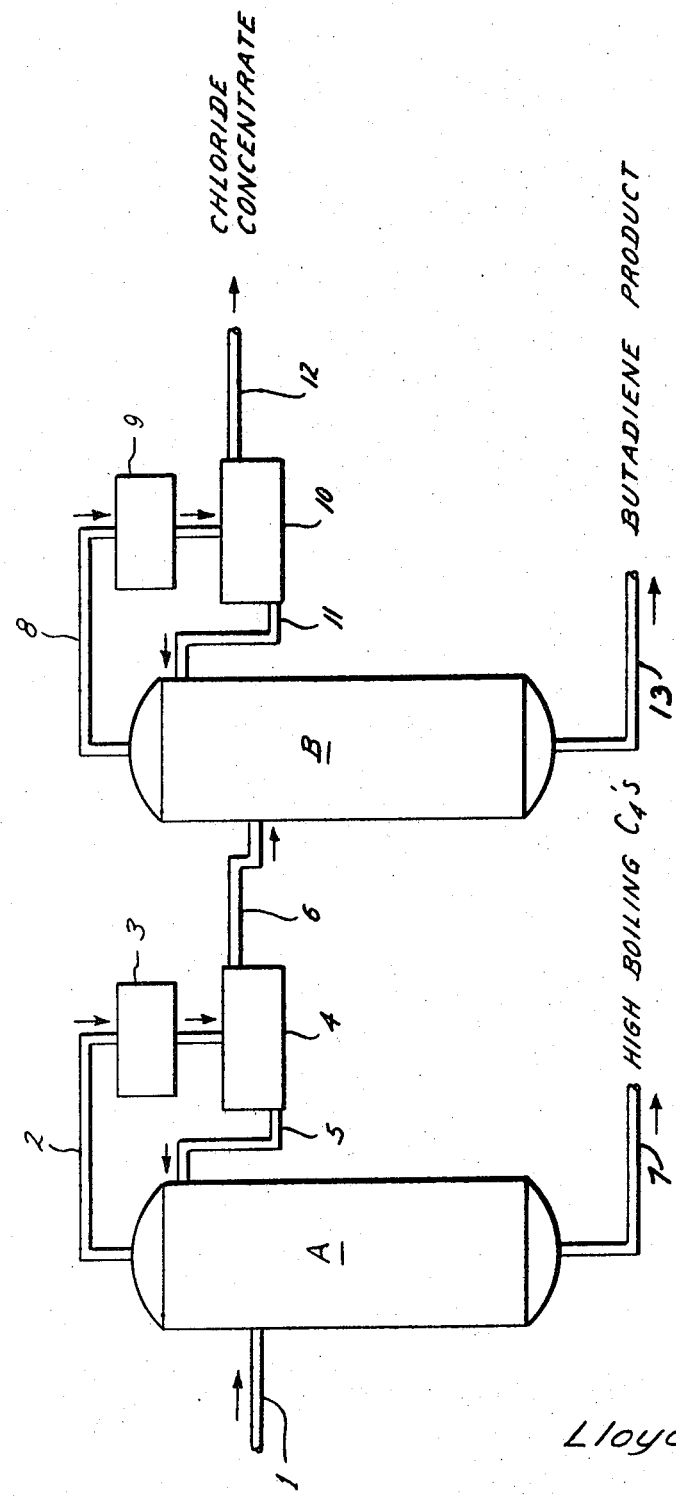

PURIFICATION OF UNSATURATED PRODUCT

This invention relates to the removal of organic chloride compounds from hydrocarbon streams. More particularly, it relates to the removal of methyl and vinyl chloride from a hydrocarbon stream containing butadiene.

The use of chlorine or a chlorine liberating material as a catalyst in the oxidative dehydrogenation of hydrocarbons has been well described in the art, for example, U.S. Pats. Nos. 3,211,800; 3,268,611; 3,268,612; 3,274,285; 3,277,207; 3,303,234; 3,306,450; 3,308,182; 3,308,184; 3,308,197-200; 3,316,320; 3,359,343; 3,420,912; 3,440,298; and 3,442,968 as well as numerous other U.S. and foreign patents. According to these patents, unsaturated hydrocarbons such as butadiene may be produced by reacting a mixture of the compound to be dehydrogenated, e.g., butene-2, oxygen and a source of chlorine at an elevated temperature. The effluent from the dehydrogenation zone or reactor comprises the unsaturated product, some unconverted feed, $CO_2$, water, possibly inert diluents (particularly if the oxygen source is air), some inorganic chloride and organic chlorides such as methyl chloride and vinyl chloride. Although these organic chlorides are present in relatively small amounts, they are serious contaminates in the product and are extremely difficult to remove. For example, methyl chloride in the butadiene significantly affects the utility of the product because of the corrosive nature of organic chlorides and because methyl chloride may affect the polymerization rate of the monomer, as well as have possible adverse effect on the polymerization catalyst.

The principal use of butadiene is the preparation of synthetic rubber such as copolymers of butadiene and styrene and butadiene and acrylonitrile. The synthesis requires an extremely pure butadiene with as little deleterious material as possible remaining therein. For example, styrene-butadiene rubber (SBR) is commercially prepared by less than a complete conversion of monomers to polymer, with the unreacted butadiene being recovered an recycled in the polymerization. Recycle of the butadiene causes a rapid buildup of organic chloride impurities thus making even low levels of contamination impractical.

Furthermore, the organic chloride represents a portion of the catalyst and in a commercial operation the loss of even a small percentage of the catalyst can radically affect the economic aspects of the process. In any event the organic chlorides are valuable dehydrogenation catalyst and should be recovered from the product for purification and recycle to the dehydrogenation zone.

The removal of water soluble inorganic halides such as HCl and $NH_4cl$ from the reactor effluent is different from that of the removal of organic chlorides. One distinction which has been found is that the organic chlorides behave similarly to the organic dehydrogenation product and as a result cannot be washed out with water. When a hydrocarbon effluent contaminated with methyl chloride and vinyl chloride is washed with water essentially all of the organic chloride pass through the water along with the washed hydrocarbon.

The problem of organic chloride removal is aggravated further by the relatively small amounts present based on the other possible components of the effluent such as unreacted feed, products such as monolefins and diolefins, steam, nitrogen, oxygen and decomposition products. The organic chloride may amount to only a few tenths percent or less of the effluent.

Several methods for separating organic halogen compounds from hydrocarbon streams are known, for example, it has been proposed to use selective solvents in extractive distillation or to react the hydrocarbon halide with an excess of ammonia to form a water soluble reaction product. It was known in the prior that it is particularly difficult to separate hydrocarbon halides, such as methyl chloride or methyl bromide, from such compounds as n-butane and butene-2 by distillation.

It has now been found that chloride impurities can be essentially completely removed from a butadiene containing stream by a particular arrangement of distillations. Briefly stated the present invention is a process for separating hydrocarbon chlorides from a mixture containing butadiene and hydrocarbon chlorides comprising passing said mixture to a fractionator, withdrawing a bottom fraction essentially free of butadiene and hydrocarbon chloride, withdrawing a first overhead comprising butadiene and hydrocarbon chloride, said first overhead having a higher concentration of hydrocarbon chloride than said mixture passing said first overhead to a second fractionator, withdrawing a second overhead, said second overhead having a substantially higher concentration of hydrocarbon chloride than said mixture or said first overhead, and withdrawing from the bottom of said second fractionator a butadiene product being substantially lower in hydrocarbon chloride than said mixture. It was found in the distillation of the methyl and vinyl chloride in the second fractionator that there is a beneficial and unexpected enhancement of the volatility of vinyl chloride relative to the $C_4$ hydrocarbons in the fractionator. The present invention is particularly useful in an integrated process for the preparation of butadiene comprising the steps of oxidatively dehydrogenating a feed comprising n-butenes at an elevated temperature in the presence of chlorine, oxygen and an oxidative dehydrogenation catalyst, producing a product gas comprising butadiene, butenes, condensable gases and hydrocarbon chlorides, condensing the condensable gases, separating said condensable gases from said product gas, contacting the product gas with hydrocarbon absorber, stripping said product gas from said absorber, depropanizing said product gas and separating hydrocarbon chlorides from said product gas wherein the improvement comprises passing said product gas from said depropanizing to a fractionator, withdrawing a bottom fraction comprising n-butenes essentially free of butadiene and hydrocarbon chloride, withdrawing a first overhead comprising butadiene and hydrocarbon chloride, said first overhead having a higher concentration of hydrocarbon chloride than said product gas, passing said first overhead to a second fractionator, withdrawing a second overhead, said second overhead having a higher concentration of hydrocarbon chloride than said product gas or said first overhead and withdrawing from the bottom of said second fractionator a butadiene product being substantially lower in n-butenes and hydrocarbon chloride concentration than said product gas.

The use of various absorber oils is shown in U.S. Pats. Nos. 3,402,215, 3,412,171 and 3,474,155. To the extent necessary to provide supportive information for carrying out the present invention these patents as well as those previously cited are hereby incorporated by reference.

Butadiene can be prepared by oxidative dehydrogenation of n-butane or n-butenes. The chlorine present in the dehydrogenation zone may be either elemental chlorine or any compound of chlorine which would liberate chlorine under the conditions of the reaction. Suitable sources of halogen are such as hydrogen chloride, aliphatic halides, such as methyl chloride, 1,2-dichloroethane, cycloaliphatic chlorides, ammonium chloride, sulfuryl chloride, metal chlorides including molten chlorides, and the like. The chlorine may be liberated partially or entirely by a solid source as disclosed in the process of U.S. Pat. No. 3,130,241 issued Apr. 21, 1964. Mixtures of various sources of chlorine may be used. The amount of chlorine, calculated as elemental chlorine, may be as little as about 0.0001 or less mole of chlorine per mole of the hydrocarbon to be dehydrogenated to as high as 0.2 or 0.5.

The hydrocarbon to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, solid oxidants, and so forth. Oxygen may also be added in increments to the dehydrogenation zone. The amount of oxygen employed may vary depending upon the desired result, such as conversion, selectivity and the number of hydrogen atoms being removed. Thus, to dehydrogenate butane to butene requires less oxygen than if the reaction proceeds to produce butadiene. Normally oxygen will be supplied (including all sources, e.g., air to the reactor) in the dehydrogenation zone in the range of from 0.2 to 2.0 moles per mole of hydrocarbon to be dehydrogenated and for most dehydrogenations this will be within the range of 0.25 to 1.5 moles of oxygen per mole of hydrocarbon.

Preferably, the reaction mixture contains a quantity of steam or diluent such as nitrogen with the range generally being between about 2 and 40 moles of steam per mole of hydrocarbons to be dehydrogenated and excellent results have been obtained within the range of about 5 to about 30 moles of steam per mole of hydrocarbon to be dehydrogenated. Diluents generally may be used in the same quantities as specified for the steam. These gases serve also to reduce the partial pressure of the hydrocarbon.

The dehydrogenation reaction may be conducted in the absence of contact catalysts, but better results are obtained if the reaction is conducted in the presence of metal or metal compound catalysts. The previously cited U.S. patents disclose a number off suitable catalysts. Particularly useful oxidative dehydrogenation catalysts comprise metal ferrites wherein the metal is Mg, Zn, Ni, Co, Mn, Cu, Cd, Ca, Ba, Sr, Cr, Ti, V, Mo, W, Na, Li, K, Sn, Pb, Sb, Bi, Ga, Ce, La, Th and mixtures thereof. The dehydrogenation reactor may be a fixed or fluid bed reactor. Reactors such as those conventionally used for the dehydrogenation of hydrocarbons to butadiene may be employed. The total pressure in the dehydrogenation zone may suitably be about atmospheric pressure. However, higher pressures or vacuum may be used. Pressures such as from about atmospheric (or below) up to about 100 to 200 p.s.i.g. may be employed. The dehydrogenation reaction will normally be conducted at a temperature of reaction between about 600°F. to about 1,500°F. or higher although generally the maximum temperature in the reactor will be within the range of about 700°F. and 1,300°F. This temperature of the reaction is measured at the maximum temperature in the reactor. The flow rates of the reactants may be varied quite widely and will be dependent somewhat on whether fixed or fluid bed reactor is employed. Good results have been obtained with flow rates of the hydrocarbon to be dehydrogenated ranging from about ¼th to 25 liquid volumes of hydrocarbon to be dehydrogenated per volume of reactor zone per hour, with the volumes of hydrocarbon being calculated as the equivalent amount of liquid hydrocarbons at standard conditions of 15.6°C. and 760 millimeters of mercury absolute. For the purpose of calculating flows, the reaction zone is defined as the portion of the reactor which contains catalyst and which is at a temperature of at least 600°F. In other words, the volume of reaction r-action zone is equivalent to the volume of the catalyst zone if it were empty. The residence or contact time of the reactants in the dehydrogenation zone depends on several factors involved in the reaction. Contact time such as about 0.001 to about 5, 10 or 25 seconds have been found to give excellent results. Under certain conditions higher contact times may be utilized. Contact time is the calculated dwell time of the reaction mixture in the reaction zone assuming the moles of product mixture are equivalent to the moles of feed.

The effluent from the dehydrogenation zone will contain the impure unsaturated hydrocarbon products, oxygen, various impurities including oxygenated hydrocarbons, non-condensable inert gases and depending upon the particular process, some unconverted feed and halogenated compounds. If air was used as the source of oxygen, nitrogen will be present in relatively large quantities as a non-condensable gas. Steam may be present in an amount up to 96 mole percent of the total effluent, such as from about 5 to 96 mole percent. The organic phase including dehydrogenated product, any unreacted feed, oxygenated hydrocarbons, any halogenated compounds, polymer and tar and precursors thereof. Any organic decomposition products usually range from about 3 to 50 mole percent of the effluent and generally will be within the range of about 3 to 30 or 35 mole percent of the effluent. The gaseous product will usually contain less than or no greater than 1.0 mole percent oxygen based on the unsaturated hydrocarbon such as butadiene. The non-condensable gases (under the conditions encountered), such as nitrogen, will be present in an amount of from about 20 to 93 mole percent of the total effluent.

The effluent gases leaving the dehydrogenation zone will generally be at temperature of about or greater than 600°F. or 700°F. to 1,600°F depending upon the particular dehydrogenation precess. The effluent gases are then cooled prior to further treatment according to this invention. The reactor effluent may be cooled by any means or combination of means as by quenching followed by employing waste heat boilers, condensers, vapor separators and the like. Ordinarily, water will be removed as condensed steam from the gaseous effluent during this cooling operation.

The gaseous effluent is then contacted with an absorber oil such as toluene, benzene, vinyl cyclohexene and the like at a temperature of 60° to 150°F. at 100 too 200 psig. The fat absorbed oil is heated in a separator at 55 to 190°F. at 15 to 50 psig to remove inert non-condensable gases including oxygen, nitrogen, $CO_2$, the various $C_2$'s and $C_3$ and acetylene compounds which are taken off as overheads and disposed of. The fat absorber oil is then sent to a hydrocarbon stripper where the unsaturated hydrocarbon is stripped off and taken overhead. This overhead may then be treated according to the present invention or conventionally depropanized to remove the remaining $C_3$'s.

The initial feed stream containing butadiene is usually a very complex mixture including, for example, isobutylene, butene-1, butene-2 (both high and low boiling) n-butane, butadiene-1,2, butadiene-1,3, a heavy fraction of $C_5$ and more carbon atoms and small quantities of both methyl chloride and vinyl chloride. The feed stream may have been partially purified prior to the present process. For example, the butadiene stream can be freed of steam and oxygen and depropanized to remove the $C_3$ and lighter hydrocarbon including a large quantity of methyl chloride originally present. It is to be understood that other materials can be present in the butadiene stream to be fractionated and the stream may be less pure or more pure than illustrated. Impurities more volatile than butadiene will be carried off in the overhead with the hydrocarbon chlorides whereas impurities less volatile than butadiene will for the most part continue in the butadiene stream or pass of in the bottoms purge. Even with considerable variation in the butadiene feed to the fractionator, the benefits of hydrocarbon chloride removal and concentration thereof can be achieved according to this invention. A particularly useful stream would be one containing at least 35 mole percent butadiene and preferably 45 to 65 mole percent butadiene and 40 to 25 mole percent butene-2. After the removal of hydrocarbon chloride the butadiene stream according to the invention can be further treated, for example, a fractionation to separate butene-2.

The drawing is a schematic representation of one embodiment of the present process. The feed stream is predominantly butadiene-1,3 with small amounts of butane, butene-2, butene-1 and trace amounts of methyl chloride and vinyl chloride. The feed stream 1 is fed to fractionator A. Fractionator A is a conventional distillation tower or column and can have from about 100 to 200 trays. The temperature gradient through fractionator A will be about 35° to 50°F, the bottom temperature being in the range of 155° to 170°F., with lower temperatures in the upper portion of tower. The feed to fractionator A may be preheated by heat exchange (not shown) and will generally be at a temperature in the range of 85° to 110°F. upon entry into fractionator A. An overhead fraction 2 containing the butadiene, methyl chloride and vinyl chloride is withdrawn and condensed in overhead condenser 3 hence to overhead accumulator 4 where a portion of the butadiene is recovered and returned as reflux 5 to fractionator A. The remainder of the material in overhead accumulator 4 is passed as feed 6 to fractionator B. The bottoms 7 from fractionator A are substantially free of butadiene and chlorides, are high in butene-2(also contain any $C_5$'s in the stream) and can be recycled as feed for the oxidative dehydrogenation. Feed 6 from fractionator A enters fractionator B at a temperature in the range of 40° to 125°F. which can be adjusted, if necessary, by heat exchange (not shown). Fractionator B is a conventional distillation tower or column with from 55 to 120 trays. The temperature differential in the tower is about 5° to 15°F. preferably less than 10°. The overhead from fractionator B passes to overhead condenser 9 and then to overhead accumulator 10. A major portion of the material in overhead accumulator 10 is returned to fractionator B as reflux. A chloride concentrate 12 is taken off of overhead accumulator 10 and consists of butadiene and butene-1 with a high concentration of methyl and vinyl chloride.

The bottoms of fractionator B are the butadiene product which is now substantially free of organic chlorides yet with very little loss in butadiene product. Normally this butadiene stream is subjected to one or more extractive distillations to remove less saturated compounds and further fractional distillations to separate methyl and vinyl acetylenes and butene-2 to give a final product of 98–99.8 mole percent butadiene.

In addition to the equipment schematically shown in the drawing other pieces of equipment conventionally employed in fractionations, particularly in regard to the convention aspects of the present invention as described may be used, such as reboilers, pumps, coolers, heat exchangers, traps, and the like.

The following example is only illustrative of the invention and is not intended to limit the invention. All percentages are weight percent unless specified otherwise.

EXAMPLE

All flow rates were calculated at 60°F. regardless of the temperature of the stream. The feed is the product of an oxidative dehydrogenation of n-butenes(77.8 liq. vol. percent butene-2, 14.2 liq. vol. percent butene-1, the remainder being principally butane and butadiene.) Halogen is supplied to the oxidative dehydrogenation as HCl in the presence of a metal ferrite catalyst. The condensable gases are first removed from product gases from the dehydrogenation zone. The product gases are then contacted with a lean absorber oil such as toluene, stripped from the absorber oil, and $C_3$ and lighter gases removed. Following this preparative procedure a feed stream having the composition and flow rates as shown in Table 1 is fed at 85°F. to a distillation tower having 150 trays. The bottoms temperature is 165°F. and a temperature at the top of the tower of 126°F.

TABLE I

|  | B/H** | Liquid Vol. % |
|---|---|---|
| Methyl Chloride | 5 ppm by mole |  |
| Vinyl Chloride | 10 ppm by mole |  |
| Butene-1 | 27.54 | 5.13 |
| Butadiene | 328.30 | 61.13 |
| Butane | 31.82 | 5.93 |
| Butene-2 (low boiling) | 91.48 | 17.03 |
| Butene2 (high boiling) | 57.93 | 10.78 |

*includes $C_5$'s.

**barrels per hour

The reflux is at 1,300 barrels per hour and corresponds to the composition shown in Table III.

The bottoms from the fractionator A are free of butadiene and halides as shown in Table II.

TABLE II

|  | B/H | Liquid Vol. % |
|---|---|---|
| Methyl Chloride |  |  |
| Vinyl Chloride |  |  |
| Butene-1 | tr |  |
| Butadiene | .30 | .41 |
| Butane | 6.59 | 8.91 |
| Butene-2 (low) | 33.47 | 45.27 |
| Butene-2 (high) | 33.57 | 45.41 |

The overhead fraction not recycled to the fractionator A passes on to fractionator B which is a distillation column with 86 trays. The feed to second fractionator has the composition and rates shown in Table III and is at about 125°F.

TABLE III

|  | B/H | Liquid Vol. % |
|---|---|---|
| Methyl Chloride | 5.8 ppm by mole |  |
| Vinyl Chloride | 11.5 ppm by mole |  |
| Butene-1 | 27.54 | 5.94 |
| Butadiene | 328.00 | 70.83 |
| Butane | 25.23 | 5.45 |
| Butene-2 (low) | 58.01 | 12.54 |
| Butene-2 (high) | 24.36 | 5.26 |

The bottoms temperature in fractionator B is about 130°F while the temperature overhead is at 120°F. The overhead is condensed and a reflux of 1,250 barrels per hour and corresponding to that shown in Table IV is returned to fractionator B while a vaporous portion of the overhead from fractionator B is drawn off containing substantially all of the chlorides as seen in Table IV.

TABLE IV

|  | B/H | Liquid Vol. % |
|---|---|---|
| Methyl Chloride | 2.36 mole % |  |
| Vinyl Chloride | 1.24 mole % |  |
| Butene-1 | .08 | 38.10 |
| Butadiene | .13 | 61.90 |
| Butane | tr |  |
| Butene-2 (low) |  |  |
| Butene-2 (low) |  |  |

The bottoms from fractionator B have .5 ppm vinyl chloride as shown in Table V which is for all practical purposes 0. and will not interfere with the butadiene subsequent purification or use.

TABLE V

|  | B/H | Liquid Vol. % |
|---|---|---|
| Methyl Chloride |  |  |
| Vinyl Chloride | 0.5 ppm mole |  |
| Butene-1 | 27.46 | 5.93 |
| Butadiene | 327.87 | 70.83 |
| Butane | 25.23 | 5.45 |
| Butene-2 (low) | 28.01 | 12.53 |
| Butene-2 (high) | 24.36 | 5.26 |

The loss of butadiene necessitated by the purification to remove the organic chlorides was only about 0.04 percent based on barrels per hour butadiene entering fractionator A and barrels per hour butadiene leaving as product from fractionator B. This loss in butadiene product is insignificant in regard to the substantial increases in yields of butadiene in the oxidative dehydrogenation attributable to the presence of the chloride, e.g., 5 to 15 mole percent absolute or more depending on Cl+ concentration, temperature, catalyst, etc.

The invention claimed is:

1. A process for separating hydrocarbon chlorides from a mixture containing butadiene, butenes, and hydrocarbon chlorides comprising (1) passing said mixture to a first fractionator, (2) withdrawing a bottom fraction from said first fractionator, said bottom fraction comprising n-butenes being essentially free of butadiene and hydrocarbon chloride, (3) withdrawing a first overhead from said first fractionator, said first overhead comprising essentially all the butadiene and hydrocarbon chloride from said mixture, (4) passing said first overhead to a second fractionator, (5) withdrawing a second overhead from said second fractionator, said second overhead containing substantially all the hydrocarbon chloride from said first overhead and up to 0.15 percent by volume of the butadiene in said first overhead and (6) withdrawing from the bottom of said second fractionator a butadiene product being substantially free of hydrocarbon chloride.

2. The process according to claim 1 wherein the temperature in the bottoms of the first fractionator is in the range of 155° to 170°F. and the temperature gradient in said first fractionator is 35° to 50°F. and the temperature in the bottoms of said second fractionator is in the range of 45 to 135°F. and the temperature gradient in said second fractionator is 5° to 15°F.

3. The process according to claim 2 wherein the said mixture containing butadiene and hydrocarbon chloride has at least 35 mole percent butadiene.

4. The process according to claim 3 wherein said mixture contains 45 to 65 mole percent butadiene and 40 to 25 mole percent butene-2.

5. In an integrated process for the preparation of butadiene comprising the steps of oxidatively dehydrogenating a feed comprising n-butenes at an elevated temperature in the presence of chlorine, oxygen and an oxidative dehydrogenation catalyst, producing a product gas comprising butadiene, butenes, condensible gases and hydrocarbon chlorides, condensing the condensible gases, separating said condensible gases from said product gas, contacting the product gas with a hydrocarbon absorber, stripping said product gas from said absorber, depropanizing said product gas and separating hydrocarbon chlorides from said product gas wherein the improvement comprises (1) passing said product gas from said depropanizing step to a fractionator, (2) withdrawing a bottoms fraction comprising n-butenes being essentially free of butadiene and hydrocarbon chloride, (3) withdrawing a first overhead from said first fractionator, said fractionator, said first overhead comprising essentially all the butadiene and hydrocarbon chloride from said product gas, (4) passing said first overhead to a second fractionator, (5) withdrawing a second overhead from said second fractionator, said second overhead comprising essentially all the hydrocarbon chloride from said first overhead and from 0.04 percent to 0.15 percent by volume of butadiene in said first overhead and (6) withdrawing from the bottom of said second fractionator a butadiene product being substantially free of hydrocarbon chloride and substantially lower in n-butenes than said product gas.

* * * * *

UNITED STATES PATENT OFFICE
CERTIFICATE OF CORRECTION

Patent No. 3,719,722                     Dated  March 6, 1973

Inventor(s)   Lloyd D. Tschopp

It is certified that error appears in the above-identified patent and that said Letters Patent are hereby corrected as shown below:

Col. 3, line 59 reads "off" but should read -- of --.
Col. 4, line 26 reads "reaction r-action zone" but should read -- reaction zone --.
Col. 4, line 65 reads "precess" but should read -- process --.
Col. 5, line 38 reads "pass of" but should read -- pass off --.
Col. 6, line 67 reads under column headed B/H, last item "57.93" but should read -- 57.93* --.
Col. 7, Table IV, last item in first column reads "Butene-2(low)" but should read -- Butene-2 (high) --.

Signed and sealed this 15th day of January 1974.

(SEAL)
Attest:

EDWARD M. FLETCHER, JR.                RENE D. TEGTMEYER
Attesting Officer                      Acting Commissioner of Patents